United States Patent
Liao et al.

(10) Patent No.: US 10,419,896 B1
(45) Date of Patent: Sep. 17, 2019

(54) WALKIE-TALKIE MESSAGING SYSTEM

(71) Applicant: Keenstar Corporation, Taipei (TW)

(72) Inventors: Li-Wen Liao, Taipei (TW); Wan-Chen Chen, Taipei (TW); Yen-Ting Ho, Taipei (TW)

(73) Assignee: Keenstar Corporation, Taipei (TW)

(*) Notice: Subject to any disclaimer, the term of this patent is extended or adjusted under 35 U.S.C. 154(b) by 0 days.

(21) Appl. No.: 16/207,393

(22) Filed: Dec. 3, 2018

(51) Int. Cl.
*H04W 4/12* (2009.01)
*H04W 74/08* (2009.01)
*H04W 84/22* (2009.01)

(52) U.S. Cl.
CPC ......... *H04W 4/12* (2013.01); *H04W 74/0808* (2013.01); *H04W 84/22* (2013.01)

(58) Field of Classification Search
CPC .... H04W 4/12; H04W 74/0808; H04R 27/00; H04R 1/1016; H04R 2201/107; H04R 2227/003; H04R 5/033; H04R 2205/021; H04R 2420/07; G06Q 20/202; G06Q 30/06
See application file for complete search history.

(56) References Cited

U.S. PATENT DOCUMENTS

| | | | |
|---|---|---|---|
| 2009/0115599 A1* | 5/2009 | Carroll | G06Q 20/202 340/539.11 |
| 2010/0250374 A1* | 9/2010 | Downes | G06Q 10/103 705/15 |

\* cited by examiner

*Primary Examiner* — Dong-Chang Shiue
(74) *Attorney, Agent, or Firm* — Lin & Associates Intellectual Property, Inc.

(57) ABSTRACT

A walkie-talkie messaging system includes a processing controller device, a sensing signal transmission unit, a master walkie-talkie, and a plurality of slave walkie-talkies. The sensing signal transmission unit is connected to the processing controller device via a wired or wireless connection, the processing controller device is connected to the master walkie-talkie via a wired connection, and the master walkie-talkie is connected to the slave walkie-talkies via a wireless connection. The processing controller device further includes a comparison module, a database, a determination module and a schedule module. The database is connected to the comparison module and the determination module, and the determination module is connected to the schedule module. The master walkie-talkie is connected to the processing controller device via an audio line, such that the processing controller device is capable of determining whether the master walkie-talkie is occupied by an activity.

3 Claims, 3 Drawing Sheets

WALKIE-TALKIE MESSAGING SYSTEM

BACKGROUND OF THE INVENTION

1. Field of the Invention

The present invention relates generally to a walkie-talkie messaging system, and more particularly to a smart walkie-talkie messaging system in which a processing controller device is connected to a master walkie-talkie device by means of an audio input and the processing controller device is capable of determining whether the master walkie-talkie is occupied by an activity.

2. The Prior Arts

As for service industries, providing suitable and instant services to customers is the optimal way to improve customer's satisfaction. In general, restaurants are commonly equipped with a wireless walkie-talkie system. Each restaurant server may wear a wireless walkie-talkie, such that when communication among the servers is needed, one server can broadcast messages to other servers by sound. For example, one of the servers can notify relevant staffs through the wireless walkie-talkie that a specific service is requested by a customer, so that the customer can be provided with the service needed.

When dining in a restaurant, if a specific service, such as ordering food, refilling drinks, and asking for check, is needed, a customer usually first waves his or her hand to call attention from the server, and then informs the server his or her needs as the server approaches. Yet, during busy meal time, incidents such as a server not appear before the customer or not available for instant service may raise complaints from the customers.

Besides, with rapid development in industrial and commercial enterprises, a large population of people moves to the city, causing concentrated population in the urban area. Since land resources are limited, traditional single-family houses were replaced by high-rise buildings. As a result, a variety of apartments and community buildings have become the norm of urban architectures.

In general, several patrol points are established within a patrol area such as factory buildings and communities, and each patrol point is provided with a log book. As patrolling in a patrol area, a security guard or a patrolman records the time of patrol and sign on the log book when he or she reaches each patrol point, to prove that patrol has been made at the patrol point. After a period of time, the log books at the patrol points are collected for management and storage.

However, it is impossible for security guards to patrol all the time. Since the patrol area a security guard is in charge of may be broad, it is inevitable that some regions within the area may be overlooked, even with the assistance of security monitors.

As a result, a system which incorporates a sensor, a detector, and a walkie-talkie worn by staffs or personnel is desired for solution to the disadvantages mentioned above.

SUMMARY OF THE INVENTION

A primary objective of the present invention is to provide a walkie-talkie messaging system comprising a processing controller device, a sensing signal transmission unit, a master walkie-talkie, and a plurality of slave walkie-talkies. The sensing signal transmission unit is connected to the processing controller device via a wired or wireless connection, the processing controller device is connected to the master walkie-talkie via a wired connection, and the master walkie-talkie is connected to the slave walkie-talkies via a wireless connection.

The processing controller device further includes a comparison module, a database, a determination module and a schedule module. The database is connected to the comparison module and the determination module, and the determination module is further connected to the schedule module.

The master and slave walkie-talkies are simplex walkie-talkies that are interchangeable and communicable with each other. However, the master walkie-talkie is different from the slave walkie-talkies in that the master walkie-talkie is connected to the processing controller device, wherein the connection is by an audio line.

When the sensing signal transmission unit is triggered, it sends a trigger signal to the comparison module of the processing controller device, such that the comparison module performs a comparison and searches for a corresponding voice message in the database and sends an action signal including the voice message to the determination module. The determination module determines whether the master walkie-talkie is occupied by an activity; if the master walkie-talkie is occupied, the determination module stores the voice message into the schedule module, at where the voice message is waiting to be transmitted; if the master walkie-talkie is not occupied, the determination module transmits the voice message to the master walkie-talkie and then the voice message is transmitted from the master walkie-talkie to the slave walkie-talkie.

Accordingly, the walkie-talkie messaging system of the present invention is advantageously adapted with a smart function of spontaneously broadcasting notifications, by using the processing controller device to determine whether the master walkie-talkie is occupied by an activity.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
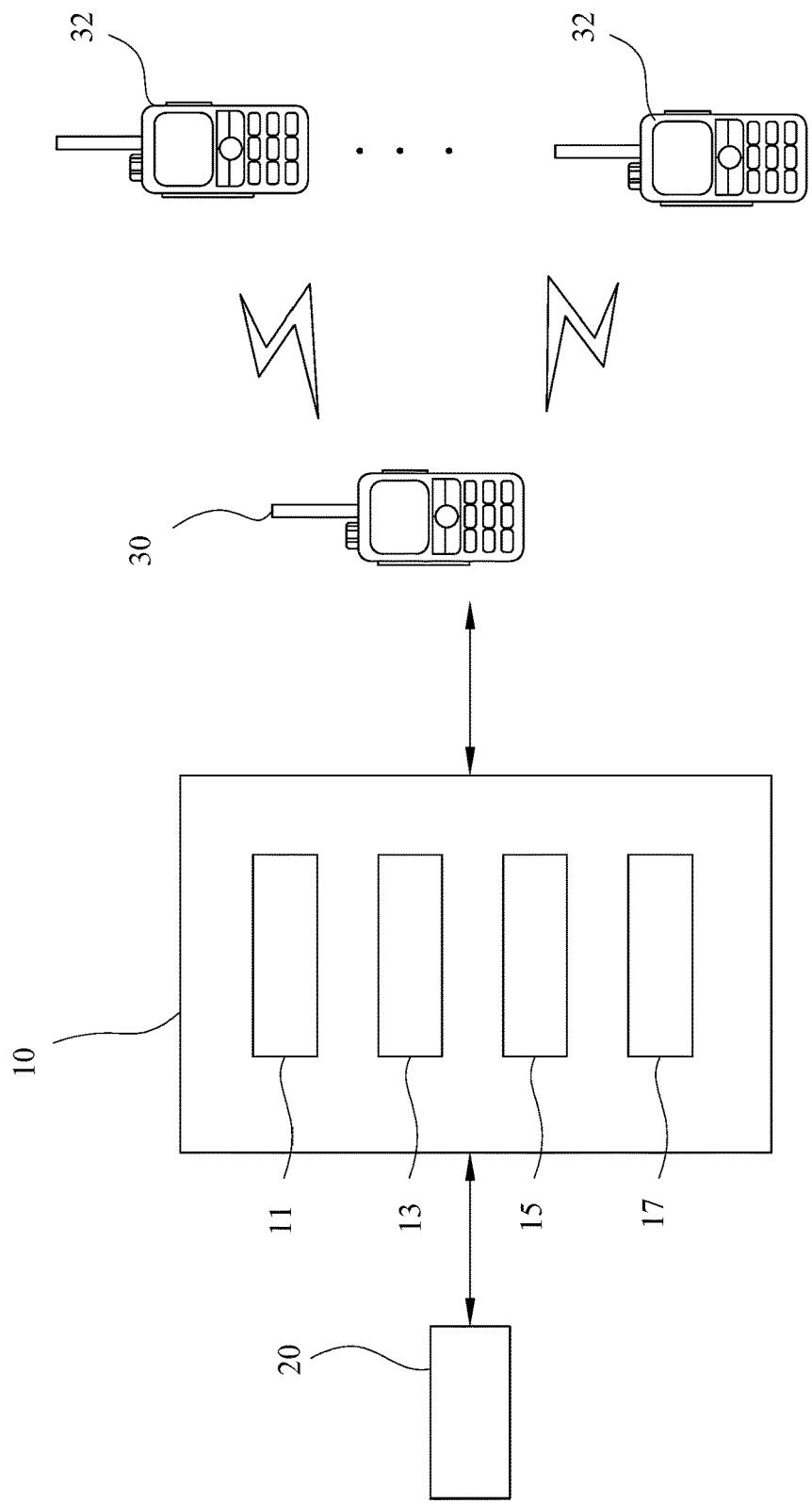
FIG. 1 is a schematic diagram illustrating the walkie-talkie messaging system according to the present invention.

Referring to FIG. 1, which is a schematic diagram illustrating the walkie-talkie messaging system according to the present invention. As shown in FIG. 1, the walkie-talkie messaging system of the present invention comprises a processing controller device 10, a sensing signal transmission unit 20, a master walkie-talkie 30, and a plurality of slave walkie-talkies 32; wherein, the sensing signal transmission unit 20 is connected to the processing controller device 10 via a wired or wireless connection, the processing controller device 10 is connected to the master walkie-talkie 30 via a wired connection, and the master walkie-talkie 30 is connected to each of the slave walkie-talkies 32 via a wireless connection.

The processing controller device 10 further includes a comparison module 11, a database 13, a determination module 15 and a schedule module 17. The comparison module 11 is connected to the database 13, the database 13 is connected to the determination module 15, and the determination module 15 is connected to the schedule module 17.

The sensing signal transmission unit 20 can be sensors, switches or other signal sources. Sensors, for example, are infrared sensors or smoke sensors. Switches, for example, are buttons or knobs. In specific, signal sources are controlled by a timer, such that the signal sources can send designated signals when they are triggered at a preset time of the timer.

The database 13 is pre-stored with a plurality of voice messages. Each of the signals triggered by different devices of the sensing signal transmission unit 20 corresponds to its own dedicated voice message.

The master walkie-talkie 30 and the slave walkie-talkie 32 are simplex walkie-talkies that are interchangeable and communicable with each other. The difference between them is that the master walkie-talkie 30 is connected to the processing controller device 10, and the connection of the master walkie-talkie 30 and the processing controller device 10 is by an audio line.

Figure 2:
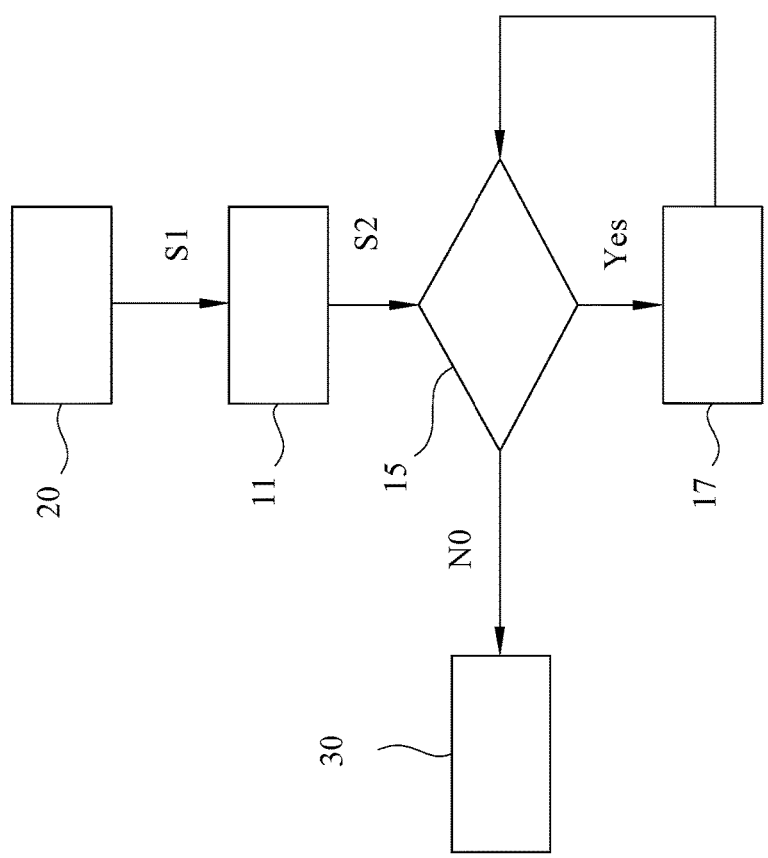
FIG. 2 is a flow chart illustrating the operation of the walkie-talkie messaging system according to the present invention.

Referring to FIG. 2, which is a flow chart illustrating the operation of the walkie-talkie messaging system according to the present invention. Once the sensing signal transmission unit 20 is triggered, a trigger signal S1 is sent to the comparison module 11 of the processing controller device 10. After receiving the signal S1, the comparison module 11 performs a comparison in the database 13 to find a corresponding voice message, and then sends an action signal S2 including the voice message to the determination module 15. The determination module 15 determines whether the master walkie-talkie 30 is occupied by an activity; if it is, the voice message is stored into the schedule module 17 and waiting to be sent; if not, the voice message is inputted to the master walkie-talkie 30 and then sent to the slave walkie-talkies 32 from the master walkie-talkie 30.

It should be noted that, the master walkie-talkie 30 and the slave walkie-talkies 32 are both general walkie-talkies with an intercom function. Yet, once the master walkie-talkie 30 is connected to the processing controller device 10, it is capable of receiving the signals from the sensing signal transmission unit 20 by means of an audio input for transmission of the voice messages, thereby having a smart function which could spontaneously broadcast notifications.

Besides, when the schedule module 17 is stored with the voice messages waiting to be sent, the determination module 15 continues to determine whether the master walkie-talkie 30 is occupied by an activity, with a predetermined time interval, until the activity of the master walkie-talkie 30 ends and all of the voice messages in the schedule module 17 have been sent.

Figure 3:
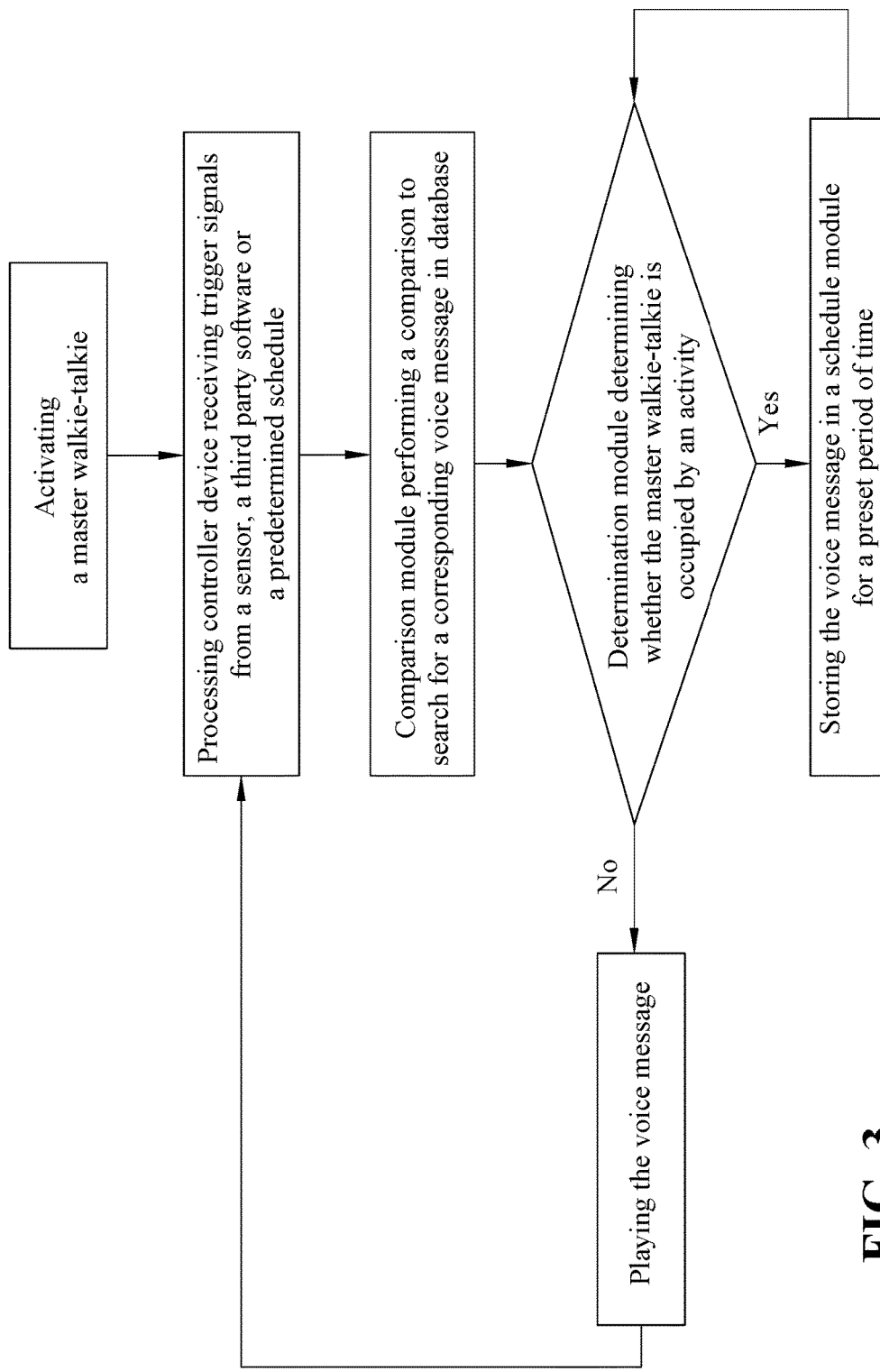
FIG. 3 is a flow chart illustrating the method of the walkie-talkie messaging system according to the present invention.

Referring to FIG. 3 for a specific method. First, the master walkie-talkie is activated. The processing controller device 10 can be triggered by a sensor, a third party software or a predetermined schedule. Once the processing controller device 10 is triggered, the comparison module 11 searches for the corresponding voice message, and then the determination module determines whether there is an activity between the master walkie-talkie 30 and the slave walkie-talkies 32; if not, the voice message is played; that is, the master walkie-talkie 30 conveys the information of the voice message to the slave walkie-talkies 32 to complete a signal cycle. If there is an activity, the voice message is stored into the schedule module 17 until the determination module 15 determines an end of the activity, after which the voice message will be played immediately.

A first application of the invention can be a security system, in which the sensing signal transmission unit 20 includes a plurality of sensors, such as infrared sensors, smoke sensors or door locks, installed on each floor of a building. The sensing signal transmission unit 20 connects to the processing controller device 10 via a wired or wireless means. The database 13 of the processing controller device 10 is pre-stored with several sets of voice messages. When one of the different sensors of the sensing signal transmission unit 20 is triggered, the trigger signal S1 is sent to the comparison module 11. The comparison module 11 then performs a comparison to find the corresponding voice message in the database 13, and further transmits the action signal S2 including the voice message to the determination module 15.

At this time, the determination module 15 determines whether the master walkie-talkie 30 is occupied by an activity; that is, whether there is a call between the master walkie-talkie 30 and the slave walkie-talkies 32 performed by a person pressing the call button. If the determination result shows there is no activity, the voice message is transmitted to the master walkie-talkie 30 by means of an audio input and then sent to each of the slave walkie-talkies 32 in the system. If the determination result shows there is an activity, the voice message is first stored in the schedule module 17 and waiting to be sent until the activity ends. The master walkie-talkie 30 is installed at the monitoring center and the slave walkie-talkies 32 are carried by each of the security guards.

A second application of the invention can be a system used in restaurants, in which the sensing signal transmission unit 20 includes a plurality of service bells provided on the tables. The service bells include at least one service item selecting from the group consisting of ordering food, refilling drinks and waiting to be seated etc. Similar to the first application, the database 13 is stored with a plurality of voice messages. When a customer presses the button of the service bell, a trigger signal S1 is generated, the comparison module 11 then searches for the corresponding voice message, and the determination module 15 and the schedule module 17 decide the time to send the voice message. The voice message is transmitted to the master walkie-talkie 30 by means of an audio input, and further transmitted to each of the slave walkie-talkies 32. The master walkie-talkie 30 is installed at the counter of the restaurant or carried by a manager, and the slave walkie-talkies 32 are carried by servers who are on duty.

In conclusion, by using the sensing signal transmission unit and utilizing the feature that the processing controller device is connected to the master walkie-talkie by means of an audio input, the present invention has a smart beneficial effect of spontaneously broadcasting notifications. In addition, the processing controller device itself is capable of determining whether there is a busy line in the system, such that the voice message to be sent will not be sent in cases of busy line, thereby preventing loss of communication information.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A walkie-talkie messaging system, comprising:
   a processing controller device including a comparison module, a database, a determination module and a schedule module, the database being connected to the comparison module and the determination module, and the determination module being further connected to the schedule module,
   a sensing signal transmission unit including a plurality of sensor devices, a plurality of detector devices, a plurality of switches or a combination thereof, the sensing signal transmission unit is connected to the processing controller device via a wired or wireless connection,
   a master walkie-talkie connecting to the processing controller device via a wired connection, and
   a plurality of slave walkie-talkies connecting to the master walkie-talkie by radio communication,
   wherein, when the sensing signal transmission unit is triggered, it sends a trigger signal to the comparison module, such that the comparison module searches for a corresponding voice message in the database and sends the same to the determination module; after receiving the voice message, the determination module immediately determines whether the master walkie-talkie is occupied by an activity; in response to the master walkie-talkie not being occupied, the determination module transmits the voice message to the master walkie-talkie by means of an audio input and then the same is sent to the slave walkie-talkie; in response to the master walkie-talkie being occupied, the determination module stores the voice message into the schedule module, such that the schedule module transmits the voice message to the master walkie-talkie when the occupied activity ends.

2. The walkie-talkie messaging system according to claim 1, wherein a plurality of the voice message is pre-stored into the database, and the trigger signal sent by different devices of the sensing signal transmission unit corresponds to a dedicated voice message.

3. The walkie-talkie messaging system according to claim 1, wherein when the schedule module is stored with at least one voice message waiting to be sent, the determination module continues to determine whether the master walkie-talkie is occupied by an activity, with a predetermined time interval, until the activity ends and all of the voice messages in the schedule module have been sent.

* * * * *